United States Patent
Kenthapadi et al.

(10) Patent No.: US 10,496,662 B2
(45) Date of Patent: Dec. 3, 2019

(54) GENERATING RELEVANCE SCORES FOR KEYWORDS

(71) Applicant: Microsoft Technology Licensing, LLC, Redmond, WA (US)

(72) Inventors: Krishnaram Kenthapadi, Sunnyvale, CA (US); Huan Van Hoang, San Jose, CA (US); Yan Liu, Sunnyvale, CA (US); Zachary Mason Roth, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 14/856,466

(22) Filed: Sep. 16, 2015

(65) Prior Publication Data

US 2017/0060964 A1    Mar. 2, 2017

Related U.S. Application Data

(60) Provisional application No. 62/211,227, filed on Aug. 28, 2015.

(51) Int. Cl.
| | |
|---|---|
| *G06F 7/00* | (2006.01) |
| *G06F 16/248* | (2019.01) |
| *G06F 16/23* | (2019.01) |
| *G06F 16/951* | (2019.01) |
| *G06F 16/2457* | (2019.01) |

(52) U.S. Cl.
CPC ............ *G06F 16/248* (2019.01); *G06F 16/23* (2019.01); *G06F 16/24575* (2019.01); *G06F 16/951* (2019.01)

(58) Field of Classification Search
CPC .................................................. G06F 16/24575
USPC ........................................................ 707/728
See application file for complete search history.

(56) References Cited

U.S. PATENT DOCUMENTS

| | | |
|---|---|---|
| 8,504,584 B1 | 8/2013 | Baker et al. |
| 8,832,132 B1 | 9/2014 | Spertus et al. |
| 8,972,396 B1 * | 3/2015 | Zhang ............... G06F 17/30687 707/730 |
| 9,367,608 B1 * | 6/2016 | Zhang ................... G06F 17/271 |

(Continued)

OTHER PUBLICATIONS

"Final Office Action Issued in U.S. Appl. No. 14/856,443", dated Apr. 19, 2018, 17 Pages.

(Continued)

*Primary Examiner* — Eliyah S. Harper
(74) *Attorney, Agent, or Firm* — Schwegman Lundberg & Woessner, P.A.

(57) ABSTRACT

A search engine optimization system is provided with an on-line social network system. The on-line social network system includes or is in communication with a search engine optimization (SEO) system that is configured to prioritize keywords (potential search terms) based on their respective predicted contribution to the ranking of JSERPs. The value of a job-related keyword is expressed as a priority score assigned to that keyword. The SEO system generates priority scores for different keywords, using a probabilistic model that takes into account a value expressing how likely the keyword is to be included in a search query as a search term and/or a value expressing how likely is a search that includes the keyword as a search term is to produce relevant results.

20 Claims, 7 Drawing Sheets

(56) References Cited

U.S. PATENT DOCUMENTS

| | | | |
|---|---|---|---|
| 9,449,080 B1* | 9/2016 | Zhang | G06F 17/27 |
| 2006/0004713 A1 | 1/2006 | Korte et al. | |
| 2006/0026147 A1 | 2/2006 | Cone et al. | |
| 2008/0235567 A1* | 9/2008 | Raj | G06F 17/243 |
| | | | 715/226 |
| 2009/0319511 A1* | 12/2009 | Sundaresan | G06F 17/30657 |
| 2010/0094878 A1* | 4/2010 | Soroca | G06Q 30/02 |
| | | | 707/748 |
| 2011/0022602 A1 | 1/2011 | Luo et al. | |
| 2011/0196802 A1 | 8/2011 | Ellis et al. | |
| 2011/0202874 A1 | 8/2011 | Ramer et al. | |
| 2011/0320441 A1 | 12/2011 | Lee et al. | |
| 2012/0109838 A1 | 5/2012 | Younger et al. | |
| 2012/0197809 A1 | 8/2012 | Earl et al. | |
| 2012/0284283 A1 | 11/2012 | Matsushita et al. | |
| 2013/0046584 A1 | 2/2013 | Yu et al. | |
| 2013/0080447 A1* | 3/2013 | Ramer | G06Q 30/02 |
| | | | 707/748 |
| 2014/0075004 A1* | 3/2014 | Van Dusen | H04L 41/04 |
| | | | 709/223 |
| 2014/0143226 A1* | 5/2014 | Haveliwala | G06F 17/30864 |
| | | | 707/706 |
| 2014/0195506 A1 | 7/2014 | Perlegos | |
| 2014/0229229 A1* | 8/2014 | Hirate | G06Q 10/00 |
| | | | 705/7.29 |
| 2014/0372329 A1 | 12/2014 | Menon et al. | |
| 2015/0127565 A1 | 5/2015 | Chevalier et al. | |
| 2015/0248721 A1* | 9/2015 | Brown | G06Q 30/0631 |
| | | | 705/26.7 |
| 2015/0324454 A1* | 11/2015 | Roberts | G06F 16/338 |
| | | | 707/734 |
| 2016/0063093 A1* | 3/2016 | Boucher | G06F 16/90324 |
| | | | 707/748 |
| 2016/0078009 A1* | 3/2016 | Tocchini | G06F 17/2247 |
| | | | 705/14.73 |
| 2016/0092550 A1* | 3/2016 | Kraft | G06F 16/9535 |
| | | | 707/737 |
| 2016/0098493 A1* | 4/2016 | Primke | G06F 16/9535 |
| | | | 707/754 |
| 2016/0103885 A1* | 4/2016 | Lee | G06F 16/3334 |
| | | | 707/739 |
| 2016/0135014 A1 | 5/2016 | Alharayeri | |
| 2016/0162488 A1* | 6/2016 | Corradi | G06Q 50/01 |
| | | | 707/734 |
| 2017/0060928 A1 | 3/2017 | Kenthapadi et al. | |
| 2017/0061381 A1 | 3/2017 | Kenthapadi et al. | |
| 2018/0060432 A1 | 3/2018 | Kenthapadi et al. | |
| 2018/0060433 A1 | 3/2018 | Kenthapadi et al. | |

OTHER PUBLICATIONS

"Final Office Action Issued in U.S. Appl. No. 14/856,455", dated May 31, 2018, 14 Pages.

"Final Office Action Issued in U.S. Appl. No. 15/247,122", dated Feb. 25, 2019, 28 Pages.

"Non Final Office Action Issued in U.S. Appl. No. 15/247,122", dated Jun. 1, 2018, 35 Pages.

"Final Office Action Issued in U.S. Appl. No. 15/247,206", dated Jan. 28, 2019, 40 Pages.

"Non Final Office Action Issued in U.S. Appl. No. 15/247,206", dated May 18, 2018, 40 Pages.

"U.S. Appl. No. 14/856,455, Examiner Interview Summary dated Jan. 17, 2018", 3 pgs.

"U.S. Appl. No. 14/856,455, Response filed Jan. 22, 2018 to Non-Final Office Action dated Sep. 29, 2017", 11 pgs.

"U.S. Appl. No. 14/856,443, Examiner Interview Summary dated Dec. 7, 2017", 3 pgs.

"U.S. Appl. No. 14/856,443, Response filed Dec. 6, 2017 to Non Final Office Action dated Sep. 7, 2017", 8 pgs.

"U.S. Appl. No. 14/856,455, Non Final Office Action dated Sep. 29, 2017", 17 pgs.

"U.S. Appl. No. 14/856,443, Non Final Office Action dated Sep. 7, 2017", 16 pgs.

* cited by examiner

GENERATING RELEVANCE SCORES FOR KEYWORDS

RELATED APPLICATION

This application claims the priority benefit of U.S. Provisional Application No. 62/211,227, filed Aug. 28, 2015, the content of which is incorporated by reference herein in its entirety.

TECHNICAL FIELD

This application relates to the technical fields of software and/or hardware technology and, in one example embodiment, to system and method to generate relevance scores for keywords for use in the context of an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member. An on-line social network may store include one or more components for matching member profiles with those job postings that may be of interest to the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
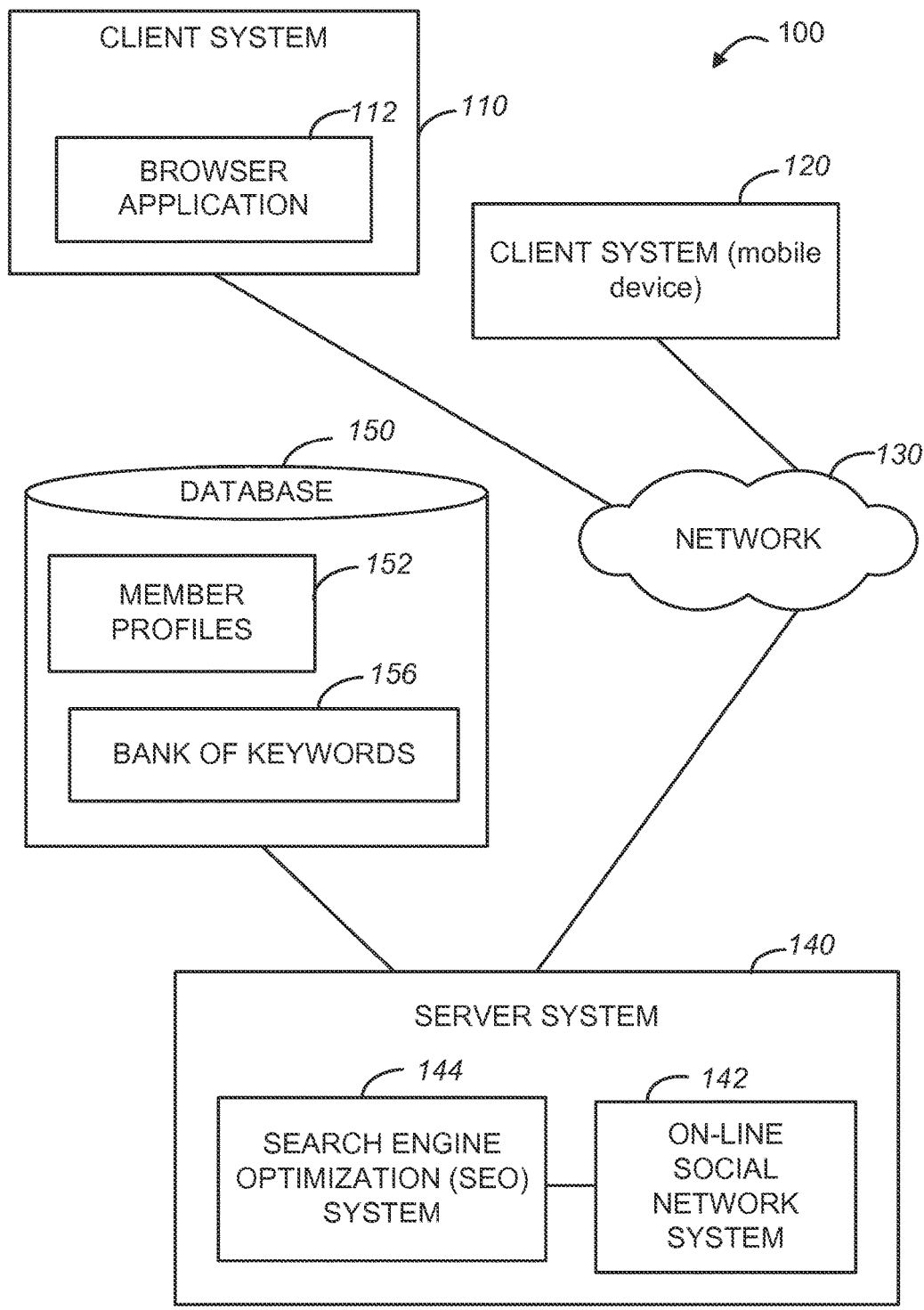
FIG. 1 is a diagrammatic representation of a network environment within which an example method and system to prioritize keywords in an on-line social network system may be implemented.

A method and system to prioritize keywords in an on-tine social network system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a. preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method describe herein and is considered as being within a scope of the present invention.

For the purposes of this description the phrases "an on-line social networking application" and "an on-line social network system" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network.

The profile information of a social network member may include various information such as, e.g., the name of a member, current and previous geographic location of a member, current and previous employment information of a member, information related to education of a member, information about professional accomplishments of a member, publications, patents, etc. The profile information of a social network member may also include information about the member's professional skills. A particular type of information that may be present in a profile, such as, e.g., company, industry, job position, etc., is referred to as a profile attribute. A profile attribute for a particular member profile may have one or more values. For example, a profile attribute may represent a company and be termed the company attribute. The company attribute in a particular profile may have values representing respective identifications of companies, at which the associated member has been employed. Other examples of profile attributes are the industry attribute and the region attribute, Respective values of the industry attribute and the region attribute in a member profile may indicate that the associated member is employed in the banking industry in San Francisco Bay Area.

Figure 6:
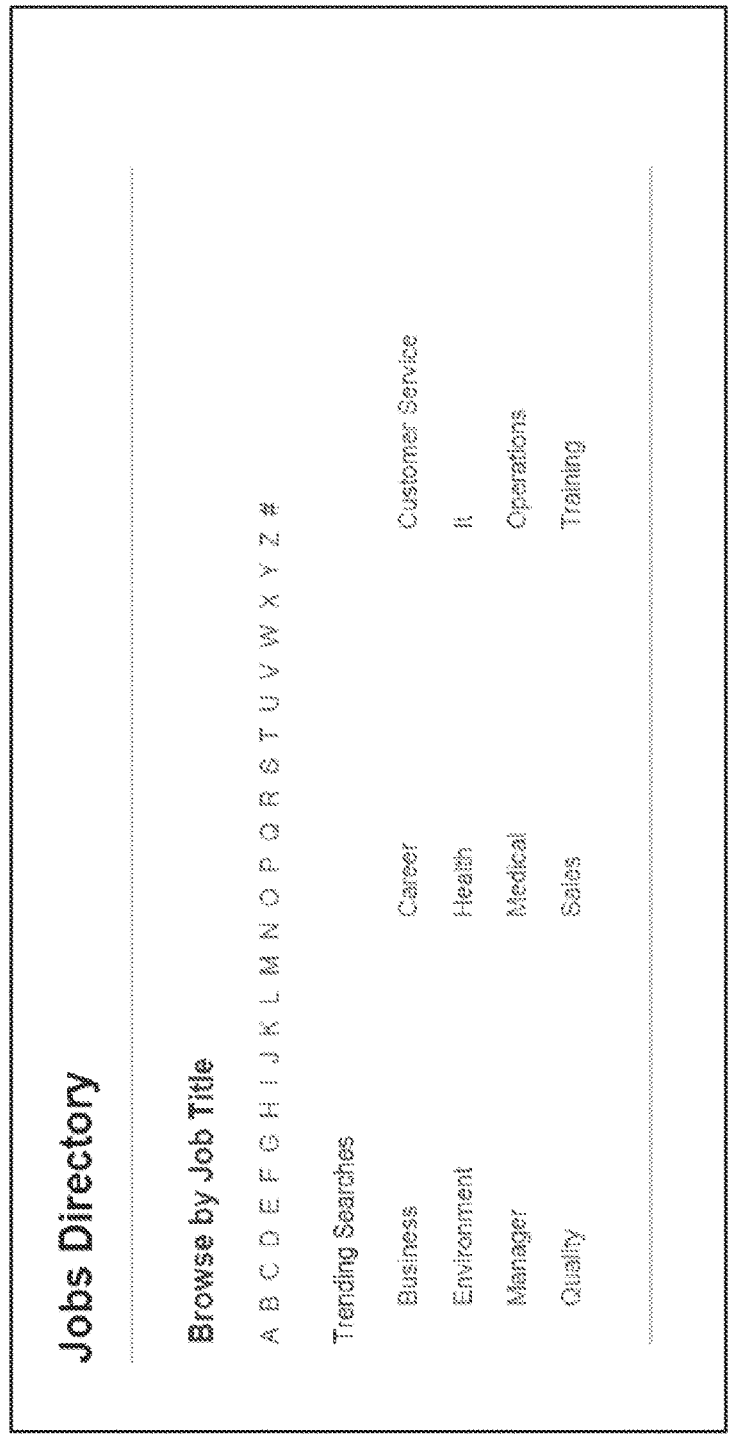
FIG. 6 is an example representation of a user interface for navigating a job search directory.

The on-line social network system also maintains information about various companies, as well as so-called job postings. A job posting, also referred to as merely "job" for the purposes of this description, is an electronically stored entity that includes information that an employer may post with respect to a job opening. The information in a job posting may include, e.g., industry, company, job position, required and/or desirable skills, geographic location of the job, etc. The on-line social network system may be configured to match member profiles with job postings, so that those job postings that have been identified as potentially being of interest to a member represented by a particular member profile are presented to the member on a display device for viewing using, e.g., a so-called job recommendation system. The job recommendation system identifies certain job postings as being of potential interest to a member and presents such job postings to the member in order of relevance with respect to the associated member profile. Job postings in the on-line social network system may be accessible to users via a job search directory web page that displays a keyword-based alphabetical index. Members may access job postings associated with a particular keyword by entering the keyword into the search box and examining the returned search results. Another way to access job postings associated with a particular keyword is to navigate to a web page representing the job search directory and click on (or otherwise engage) a link represented by the keyword of interest, which would cause presentation of references to the job postings containing that keyword. An example representation of a user interface 600 for navigating a job search directory is shown in FIG. 6.

While the on-line social network system may be used beneficially to assist its members in their job searches, a person who may be considered an active job seeker may not necessarily be a member of the on-tine social network system. At the same time, active job seekers, even if they are not yet members, may benefit when a search using an on-tine search engine returns, as results, job postings maintained by the on-line social network system. The on-line social network system may be configured to provide to users, regardless of their membership with the on-line social network system, a rich job search experience where JSERPs (job search results pages) that originate from the on-line social network system are ranked at the top of the search results. The on-line social network system, in one embodiment, is configured to prioritize keywords (potential search terms) based on their respective predicted contribution to the ranking of JSERPs. The value of a job-related keyword may be expressed as a priority score assigned to that keyword. One approach to prioritization of keywords is based on the number of job postings in the on-line social network system that include respective keywords. This approach, by itself, may not always be optimal, because some keywords could be over-utilized in the job postings. One example of such over-utilized keyword is "assistant." While the keyword "assistant" may be included in a great number of job postings, this keyword is not necessarily of enough importance in contributing to the ranking of the JSERPs (job search results pages In one example embodiment, the on-line social network system includes or is in communication with a search engine optimization (SEO) system that is configured to calculate respective priority scores for job-related keywords and use these priority scores for enhancing the users' on-line job search experience. A set of keywords to be scored may be selected automatically or manually and stored in a database as a bank of keywords. The SEO system may be configured to generate priority scores for different keywords, using a probabilistic model that takes into account a value expressing how likely the keyword is to be included in a search query as a search term and a value expressing how likely is a search that includes the keyword as a search term is to produce relevant results. A value expressing how likely the keyword is to be included in a search query as a search term may be referred to as a popularity score. A value expressing how likely a search that includes the keyword as a search term is to produce relevant results may be referred to as a relevance score. In some embodiments, the priority score for a keyword may be generated by multiplying the relevance score for a keyword by the popularity score for that same keyword, e.g. using Equation 1 shown below.

$$\text{PrioirtyScore}(w) = Pr(\text{RELEVANT} \& w) = Pr(w) * Pr(\text{RELEVANT}/w),\quad\text{Equation (1):}$$

where w is a keyword, Pr(w) is probability expressing the popularity score for the keyword w, and Pr(RELEVANT/w) is probability expressing the relevance score for the keyword w.

The keywords that have higher priority scores are considered to be more valuable, and, as such, can be included into the job search directory and/or can be used to determine which JSERP pages to be included into a sitemap submitted to one or more third party search engines (such as, e.g., Google® or Bing®).

As mentioned above, a value expressing how likely the keyword is to be included in a search query as a search term is referred to as a popularity score. Popularity of a keyword provides an indication of how frequently the keyword is used in job-related searches. In order to generate popularity score Pr(w) for a particular keyword w (a subject keyword), the SEO system monitors job-related searches that include the subject keyword. In one embodiment, the SEO system monitors, for a period of time, all job-related searches performed by one or more certain target third party search engines (e.g., Google®, Yahoo®), as well as job-related searches performed within the on-line social network system. The results of monitoring of each of these sources with respect to a particular keyword ware used to generate respective intermittent popularity values $P_j(w)$, where j is the j-th data source from k data sources. For example, $P_j(w)$ for Google® data source may be determined based on the percentage of job-related searches that include the keyword w.

When the on-line social network system is used as a data source for determining $P_j(w)$, the SEO system considers every search request to be a job-related search. When a third party search engine is used as a data source for determining $P_j(w)$, the SEO system may first determine whether the intent of the search is related to job search and take into account only those searches that have been identified as job-related, while ignoring those searches that have not been identified as job-related. Identifying a job search directed to a third party search engine as being job-related could be accomplished by detecting the presence, in a search request, of additional terms that have been identified as intent indicators, such as, e.g., the word "job" or "career."

Because the popularity values generated based on data obtained from different may be in different scales, the SEO system may be configured to first normalize the intermittent popularity values $P_j(w)$ for a given keyword w, and then aggregate the normalized popularity values to arrive at the popularity score Pr(w). This approach may be expressed by Equation (2) shown below, $$Pr(w) = \text{popularityAggregateFunction } (\text{normFunction}_1(P_1(w)), \text{normFunction}_2(P_2(w)), \ldots, \text{normFunction}_k(P_k(w))) \quad \text{Equation (2)}$$

In one embodiment, a different normalization function is used for each of the intermittent popularity value (normFunction1 for $P_1(w)$, normFunction2 for $P_2(w)$, etc.). The aggregation function, denoted as popularityAggregateFunction in Equation (2) above, can be chosen to be one of max, median, mean, mean of the set of normalized popularity values selected from a certain percentile range, e.g., from 20th to 80th percentile. In some embodiments, the aggregation function can be the output of a machine learning model (such as logistic regression) that is learned over ground truth data. The normalization function normFunction$_j(P_j(w))$ is to map each of the intermittent popularity value $P_j(w)$ to the same interval.

For example, the normalization function scale($P_j(w)$) may map each of the intermittent popularity value $P_j(w)$ to the interval [0, 1] and utilize three percentile values—the lower threshold ($\alpha$-percentile value), the median (50-percentile value), and the upper threshold ($\beta$-percentile value). The normalization function performs piecewise linear mapping from the intermittent popularity values to [0, 1]. An intermittent popularity value is mapped to 0 if it is less than the lower threshold. Linear scaling to [0, 0.5] is performed for intermittent popularity values that are greater than or equal to the lower threshold and less than or equal to the median. Linear scaling to [0.5, 1] is performed for intermittent popularity values that are greater than or equal to the median and less than or equal to the upper threshold. An intermittent popularity value is mapped to 1 if it is greater than the upper threshold. The max value from the set of normalized popularity values may then be used as the aggregation function: max(scale($P_1(w)$), scale($P_2(w)$), . . . , scale($P_2(w)$)). The scaling applied to each of the intermittent popularity value may be different since the percentile values could be different for each intermittent popularity type.

In some embodiments, the SEO system may be configured to use the popularity score of a keyword as the priority score for that keyword. Yet in other embodiments, as stated above, respective popularity scores generated for the keywords may be used to derive the respective corresponding priority scores, e.g., by multiplying the value expressing the popularity score by the value expressing the relevance score, as expressed by Equation (1) above.

As mentioned above, a value expressing how likely a search that includes the keyword as a search term is to produce relevant results may be referred to as a relevance score. In one embodiment, the SEO system may be configured to determine the relevance score Pr(RELEVANT/w) for a keyword w using multiple indicators of relevance.

One example of an indicator of relevance of a keyword is the number of search results returned in response to a query that includes a keyword as a search term and that originates from the on-line social network system. Another indicator of relevance of a keyword may be related to respective quality scores assigned to the returned results. For example, a third party search engine returns search results in response to a query that includes a keyword as a search term. The returned results each have a quality score assigned to it by the search engine. The sum of quality scores of those returned search results that originate from the on-line social network system may be used by the SEO system as one of the indicators of relevance of that keyword. Yet another indicator of relevance of a keyword may be obtained based on monitoring user engagement signals with respect to the search results returned in response to a query that includes a keyword as a search term and that originate from the on-line social network system. For example, with respect to the search results returned in response to a query that includes a keyword as a search term and that originate from the on-line social network system, the SEO system may monitor and record signals such as click through rate (CTR) and bounce rate. These signals can be aggregated over individual job results (JSERPs) to obtain a combined user engagement score for that JSERP. This user engagement score may be then utilized in deriving the relevance score for the keyword.

Another indicator of relevance of a keyword may be obtained by examining member profiles in the on-line social network system. For example, the SEO system may determine how frequently a keyword in used in a member profile to designate a skill or a job title. The intuition is that job opportunities correlate with the number of professionals with a given skill/title, and hence people are likely to use such keywords as search terms, and are likely to find relevant job results for such keywords.

Different indicators of relevance with respect to a particular keyword w are used to generate respective intermittent popularity values $P_j$(RELEVANT/w), where j is the j-th data source from k data sources. Because the popularity values generated based on data obtained from different may be in different scales, the SEO system may be configured to first normalize the intermittent popularity values $P_j$(RELEVANT/w) for a given keyword w, and then aggregate the normalized popularity values to arrive at the popularity score Pr(RELEVANT/w. This approach may be expressed by Equation (3) shown below.

$$Pr(\text{RELEVANT}/w) = \text{relevanceAggregateFunction}(\text{normFunction}_1(P_1(\text{RELEVANT}/w)), \text{normFunction}_2(P_2(\text{RELEVANT}/w)), \ldots, \text{normFunction}_1(P_1(\text{RELEVANT}/w))) \quad \text{Equation (3)}$$

A different normalization function may be used for each of the intermittent relevance value (normFunction1 for $P_1$(RELEVANT/w), normFunction2 for $P_2$(RELEVANT/w), etc.). Furthermore, in some embodiments, these normalization functions are also different from those used for popularity score computation. The aggregation function, denoted as relevanceAggregateFunction in Equation (3) above, can be chosen to be one of max, median, mean, mean of the set of normalized popularity values selected from a certain percentile range, e.g., from 20th to 80th percentile. In some embodiments, the aggregation function can be the output of a machine learning model (such as logistic regression) that is learned over ground truth data. In some embodiments, the normalization function normFunction($P_j$(RELEVANT/w)) is to map each of the intermittent popularity value $P_j$(RELEVANT/w) to the same interval and utilize two threshold values—the lower threshold ($\epsilon 1$), and the upper threshold ($\epsilon 2$).

For example, with respect to the intermittent $P_j$(RELEVANT/w) is the number of search results returned in response to a query that includes a keyword as a search term that originate from the on-line social network system, the normalization function scale($P_j$(RELEVANT/w)) maps the job result count to [0, 1] using a step function: 0 if the job result count is fewer than the lower threshold, 1 if the job result count is greater than the upper threshold. If the job result count is greater than the lower threshold and less than the upper threshold, its normalized value is calculated as shown in Equation (4) below.

$$\text{scale}(P_j(\text{RELEVANT}/w)) = (P_j(\text{RELEVANT}/w)) - \varepsilon 1)/(\varepsilon 2 - \varepsilon 1) \quad \text{Equation (4)}$$

In another example, where the intermittent $P_j$(RELEVANT/w) is the sum of quality scores of those returned search results that originate from the on-line social network system, a combined quality score for the page and the keyword w is derived using an aggregation function such as max, median, mean, mean of the values between certain percentiles (e.g., from 20th to 80th percentile), etc. The aggregation function can also take into account position discounting, that is, provide greater weight to jobs search results at top positions. As explained above, in some embodiments, respective relevance scores generated for job-related keywords may be used to derive respective priority scores, e.g., by multiplying the value expressing the relevance score for a keyword by the value expressing the popularity score for that same keyword, as expressed by Equation (1) above, An example keyword prioritization system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a search engine optimization (SEO) system 144. As explained above, the SEO system 144 may be configured to prioritize keywords based on their respective predicted contribution to the ranking of JSERPs. The value of a job-related keyword is expressed as a priority score assigned to that keyword. In different embodiments the SEO system 144 generates priority scores for keywords, using a probabilistic model that takes into account a value expressing how likely the keyword is to be included in a search query as a search term and/or a value expressing how likely is a search that includes the keyword as a search term is to produce relevant results. An example keyword prioritization system, which corresponds to the SEO system 144 is illustrated in FIG. 2.

Figure 2:
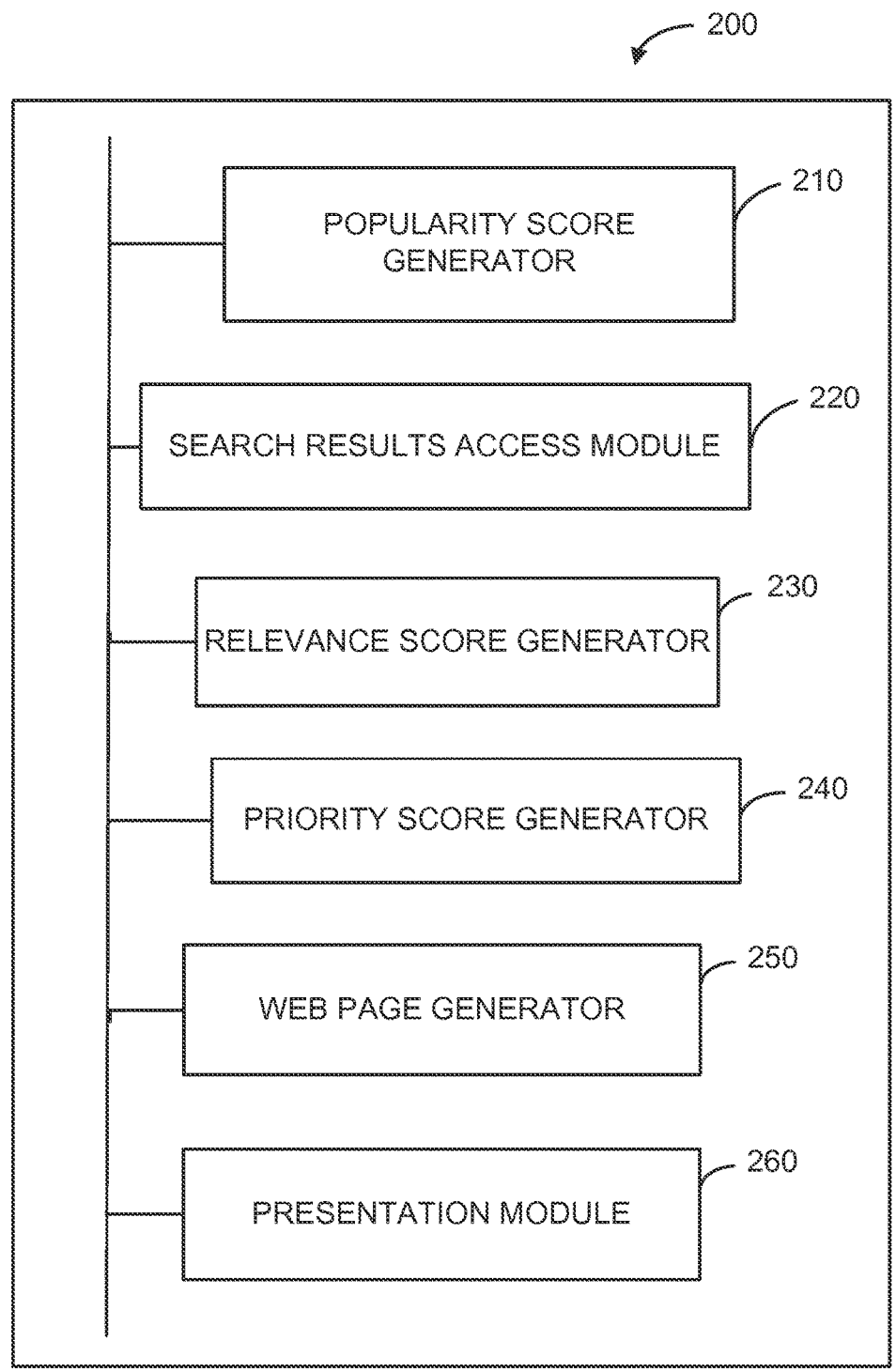
FIG. 2 is block diagram of a system to prioritize keywords in an on-line social network system, in accordance with one example embodiment.

FIG. 2 is a block diagram of a system 200 to prioritize keywords in an on-line social network system 142 of FIG. 1. As shown in FIG. 2, the system 200 includes a popularity score generator 210, a search results access module 220, a relevance score generator 230, and a priority score generator 240. The popularity score generator 210 may be configured to generate respective popularity scores for keywords, using the methodologies described above. As explained above, the popularity score of a keyword indicates how likely the subject keyword is to be included in a job-related search query as a search term. For example, the popularity score generator 210 may monitor job-related search requests that include a subject keyword, and determine a popularity score for the subject keyword based on frequency of appearance of the subject keyword in the monitored search requests. In one embodiment, the popularity score generator 210 monitors search requests directed to a search engine provided by an on-line social network system and also search requests directed to a third party search engine and, based on the results of the monitoring generate respective intermittent popularity values for the subject keyword. The popularity score generator 210 may then apply a normalization function to the intermittent popularity values and aggregate the resulting scaled values to generate the popularity score for the keyword. The normalization function may be, e.g., max, median, or mean of the intermittent popularity values.

As explained above, when the on-line social network system is used as a data source while monitoring search requests, the popularity score generator 210 considers every search request to be a job-related search. When a third party search engine is used as a data source, the popularity score generator 210 may first determine whether the intent of the search is related to job search and take into account only those searches that have been identified as job-related, while ignoring those searches that have not been identified as job-related. Identifying a job search directed to a third party search engine as being job-related could be accomplished by detecting the presence, in a search request, of additional terms that have been identified as intent indicators, such as, e.g., the word "job" or "career."

The set of search results generated by a third party search engine (a third party search engine provided by an entity that is distinct from an entity that provides the on-line social network system) may include one or more entries that originate from the on-line social network system. The entries that originate from the on-line social network system are referred to as relevant entries for the purposes of this description Relevant entries may be, e.g., job postings maintained by the on-line social network system. The search results access module 220 may be configured to access a set of search results produced by a third party search engine in response to a search request that includes a subject keyword. The set of search results is used by the relevance score generator 230 to generate the relevance score for the subject keyword using information associated with the relevant entries in the set of search results. As stated above, the relevance score expressing how likely a search that includes the subject keyword as a search term is to produce relevant results. The relevance score generator 230 generates the relevance score using one or more methodologies described above.

For example, where the third party search engine assigns a respective quality score to each entry in the set of search results, the relevance score generator 230 may be configured to generate the relevance score for the subject keyword using a combination (e.g., the sum) of respective quality scores assigned to the relevant entries in the set of search results. In some embodiments, the relevance score generator 230 may also use a count of the relevant entries in the set of search results. Other signals that can be used by the relevance score generator 230 to generate a relevance score may be data that reflects user engagement with respect to relevant entries in the set of search results. For example, the relevance score generator 230 may be configured to monitor user engagement signals with respect to any of the relevant entries (e.g., clicks the duration of viewing, etc.) and adjust the relevance score based on the results of the monitoring. The priority score generator 240 may be configured to generate a priority score for the subject keyword utilizing its popularity score, its relevance score, or both. For example, a priority score for the subject keyword may be generated by calculating a product of the popularity score and the relevance score. The priority score generator 240 may also be configured to adjust the priority score based on frequency of appearance of the subject keyword in certain fields (e.g., skills or title fields) of member profiles maintained by the on-line social network.

Also shown in FIG. 2 are a web page generator 250 and a presentation module 260. The web page generator 250 may be configured to selectively include the subject keyword in a web page generated by the on-line social network system, based on the priority score. For example, the keywords that have higher priority scores may be included into a web page representing the job search directory, while the keywords that have lower priority scores may be omitted from that web page. As a further example, those job posting that include one or more keywords that have higher priority scores may be included into a sitemap submitted to one or more third party search engines, while those job posting that do not include any of the higher-scoring keywords may be omitted from such sitemap. The presentation module 260 may be configured to cause presentation, on a display device, various web pages (e.g., a web page representing a member profile or a web page representing a job search directory). Some operations performed by the system 200 may be described with reference to FIG. 3-5.

Figure 3:
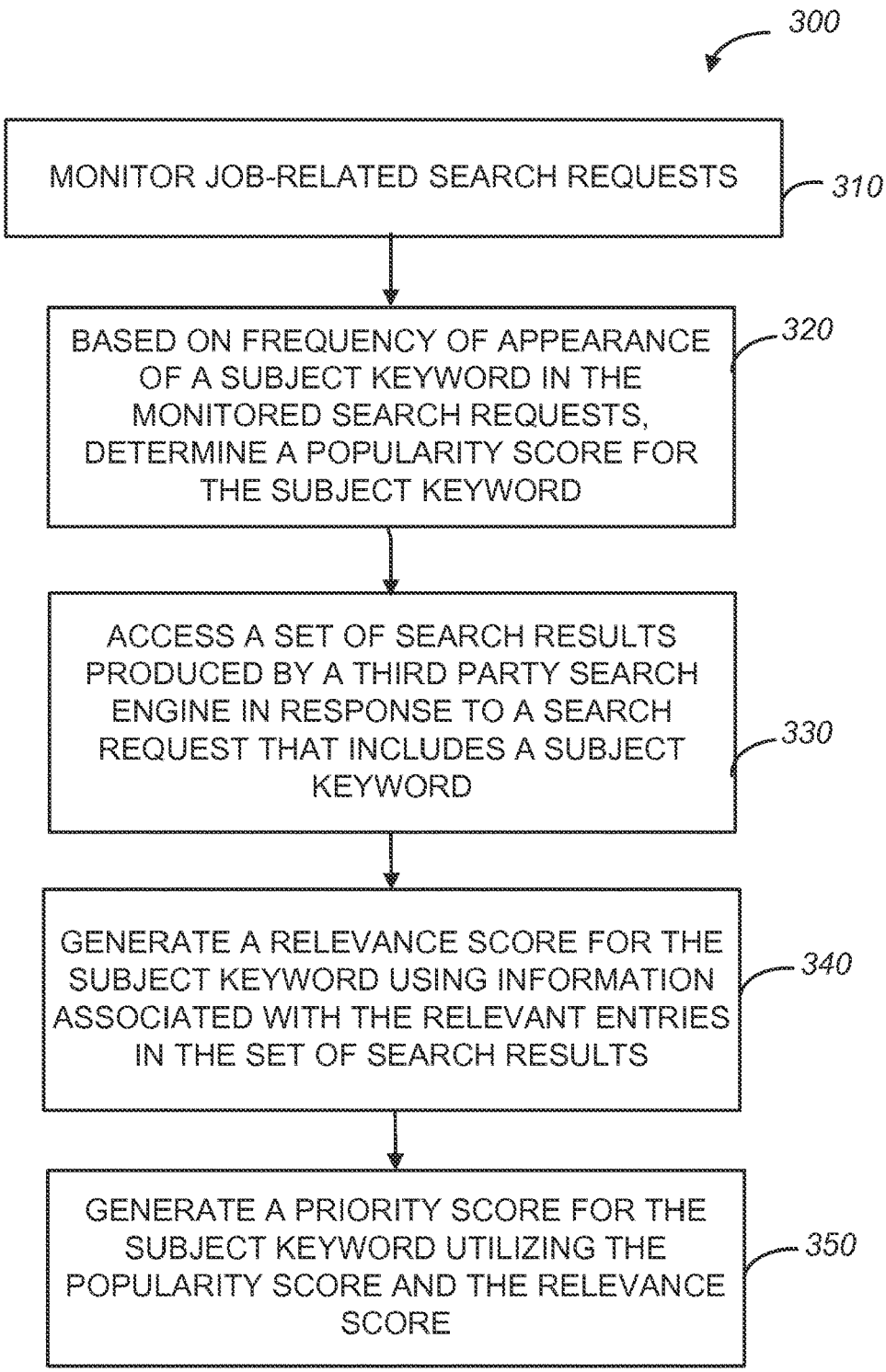
FIG. 3 is a flow chart illustrating a method to prioritize keywords in an on-line social network system, in accordance with an example embodiment.

FIG. 3 is a flow chart of a method 300 to prioritize keywords in an on-tine social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the popularity score generator 210 of FIG. 2 monitors job-related search requests and determines a popularity score for the subject keyword based on frequency of appearance of a subject keyword in the monitored search requests at operation 320. At operation 330, the search results access module 220 of FIG. 2 accesses a set of search results produced by a third party search engine in response to a search request that includes a subject keyword. Each entry in the set of search results has a respective quality score assigned by the third party search engine. The set of search results includes one or more relevant entries that originate from the on-line social network system 142 of FIG. 1. The third party search engine and the on-line social network system are provided by different entities.

At operation 340, the relevance score generator 230 of FIG. 2 generates a relevance score for the subject keyword using information associated with the relevant entries in the set of search results. At operation 350, the priority score generator 240 of FIG. 2 generates a priority score for the subject keyword utilizing the popularity score and the relevance score.

Figure 4:
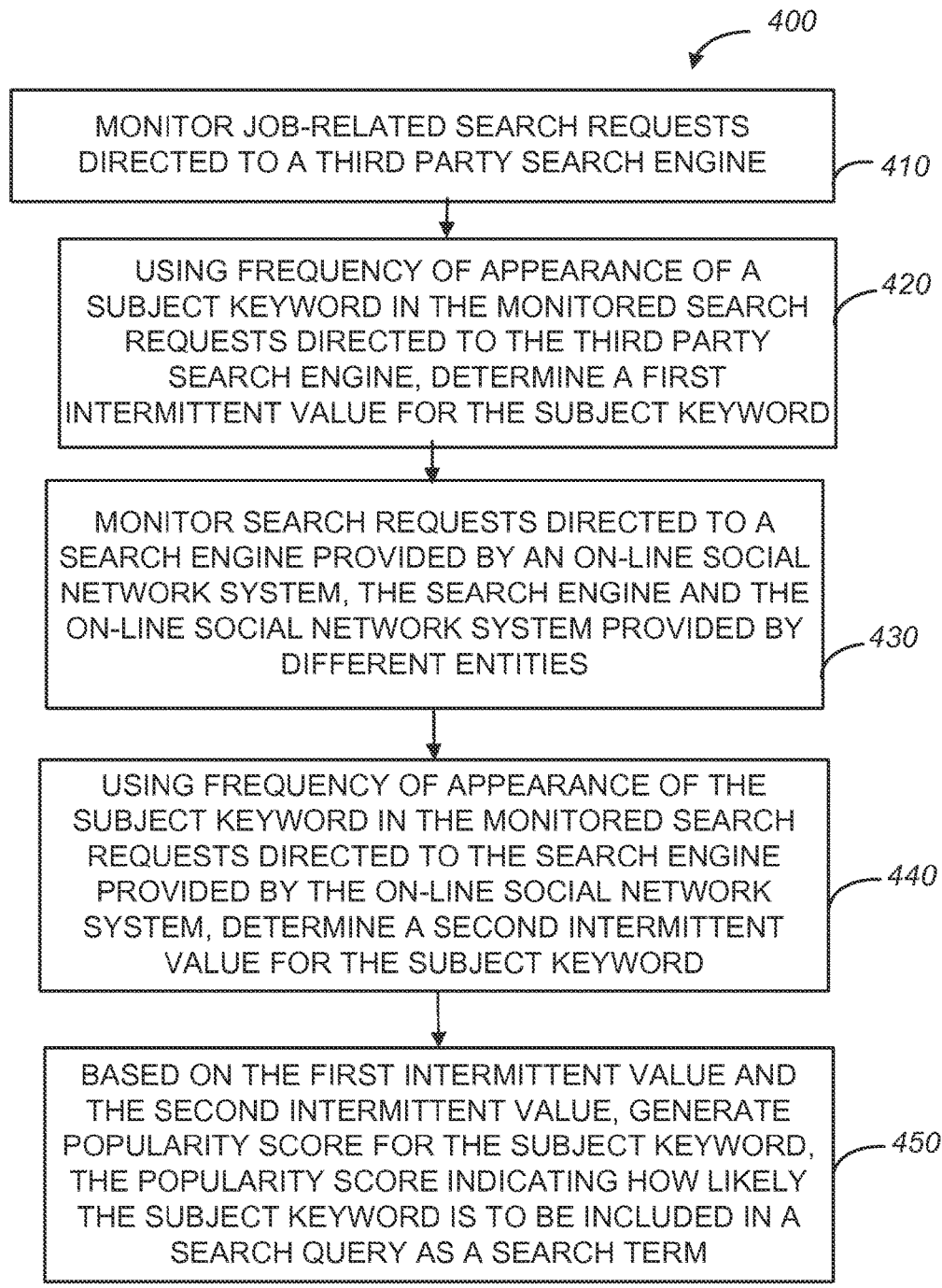
FIG. 4 is a flow chart illustrating a method to generate popularity scores keywords, in accordance with an example embodiment.

FIG. 4 is a flow chart illustrating a method 400 to generate popularity scores keywords, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the popularity score generator 210 of FIG. 2 monitors job-related search requests directed to a third party search engine and determines a first intermittent value for the subject keyword using frequency of appearance of a subject keyword in the monitored search requests directed to the third party search engine, at operation 420. At operation 330, the popularity score generator 210 monitors search requests directed to a search engine provided by an on-line social network system and determines a second intermittent value for the subject keyword using frequency of appearance of the subject keyword in the monitored search requests directed to the search engine provided by the on-line social network system. At operation 340, the popularity score generator 210 generates popularity score for the subject keyword based on the first intermittent value and the second intermittent value. The popularity score indicates how likely the subject keyword is to be included in a search query as a search term. At operation 350, the priority score generator 240 generates a priority score for the subject keyword utilizing the popularity score.

Figure 5:
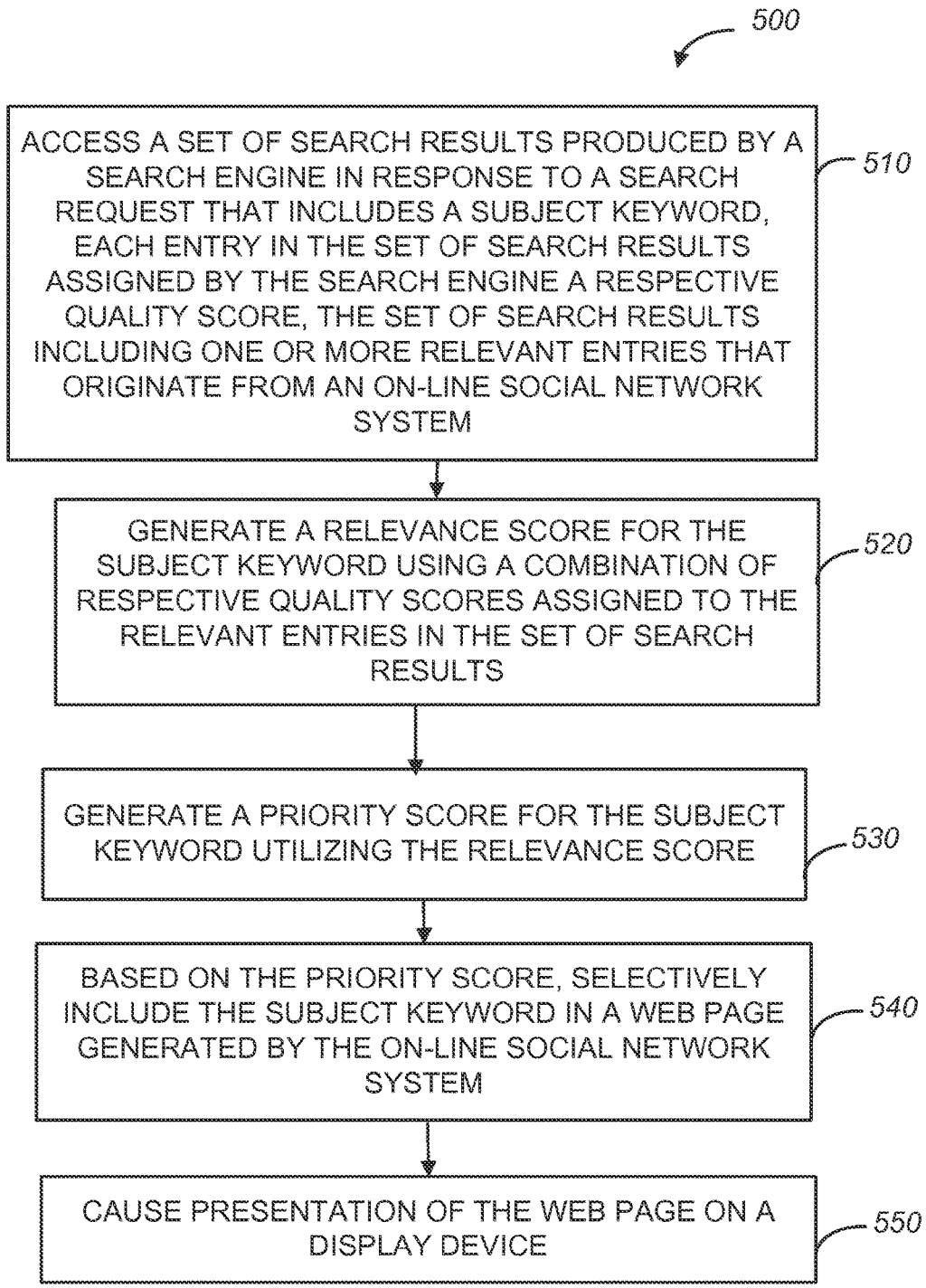
FIG. 5 is a flow chart illustrating a method to generate relevance scores for keywords, in accordance with an example embodiment.

FIG. 5 is a flow chart illustrating a method 500 to generate relevance scores for keywords, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 5, the method 500 commences at operation 510, when the search results access module 220 of FIG. 2 accesses a set of search results produced by a search engine in response to a search request that includes a subject keyword. Each entry in the set of search results has a respective quality score assigned by the third party search engine. The set of search results includes one or more relevant entries that originate from the on-line social network system 142 of FIG. 1. The third party search engine and the on-line social network system are provided by different entities. At operation 520, the relevance score generator 230 of FIG. 2 generates a relevance score for the subject keyword using a combination of respective quality scores assigned to the relevant entries in the set of search results. At operation 530, the priority score generator 240 of FIG. 2 generates a priority score for the subject keyword utilizing the relevance score. At operation 540, the web page generator 250 of FIG. 2 selectively includes the subject keyword in a web page generated by the on-line social network system, based on the priority score. At operation 550, the presentation module 260 of FIG. 2 causes presentation of the web page on a display device.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 7:
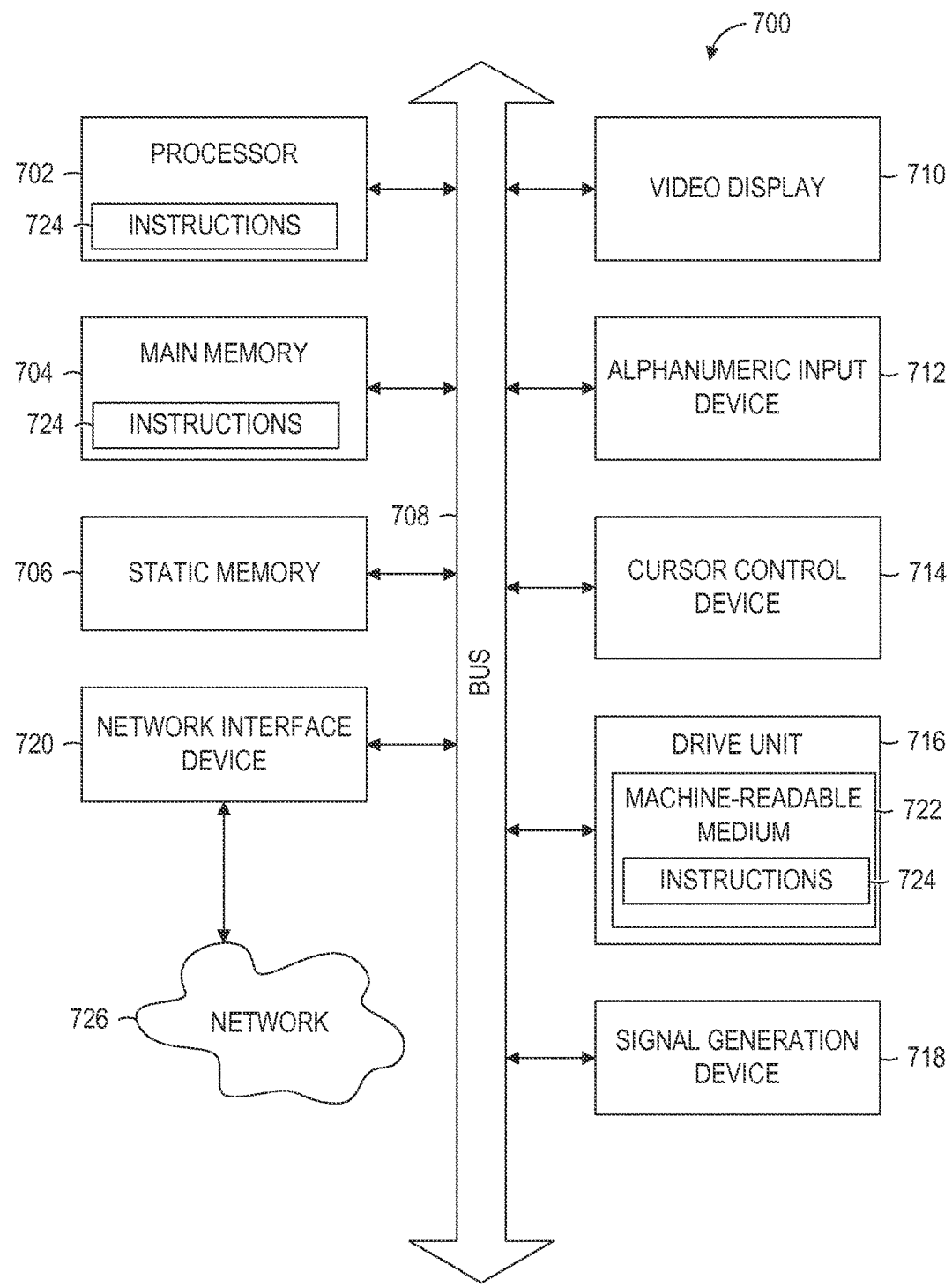
FIG. 7 is a diagrammatic representation of an example machine in the form of a computer system within which a set of instructions, for causing the machine to perform any one or more of the methodologies discussed herein, may be executed.

FIG. 7 is a diagrammatic representation of a machine in the example form of a computer system 700 within which a set of instructions, for causing the machine to perform any one or more of the methodologies discussed herein, may be executed. In alternative embodiments, the machine operates as a stand-atone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to generate relevance scores for keywords in an on-line social network system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
accessing a set of search results produced by a search engine in response to a search request that includes a subject keyword, each entry in the set of search results assigned by the search engine a respective quality score, the set of search results including one or more relevant entries that originate from an on-line social network system, the search engine and the on-line social network system provided by different entities;
calculating a relevance score for the subject keyword as the sum of respective quality scores assigned to the entries in the set of search results that originate from the on-line social network system;
executing by at least one processor a probabilistic model that takes into account the relevance score to generate a priority score for the subject keyword;
based on the priority score, selectively including the subject keyword in a web page generated by the on-line social network system; and causing presentation of the web page on a display device.

2. The method of claim 1, wherein each item from the one or more relevant entries is a job posting maintained by the on-line social network system.

3. The method of claim 1, comprising selecting the set of search results to access in response to determining that the search request includes an indicator term in addition to the subject keyword, the indicator term indicating that the search request is a job-related search request.

4. The method of claim 1, comprising using one or more further signals, in addition to the combination of respective quality scores assigned to the relevant entries in the set of search results, to generate the relevance score.

5. The method of claim 4, wherein a signal from the one or more further signals is a count of the relevant entries.

6. The method of claim 1, comprising:
monitoring user engagement signals with respect to any of the relevant entries; and
adjusting the relevance score based on result of the monitoring.

7. The method of claim 1, wherein the generating of the priority score comprises using, in addition to the relevance score, a popularity score generated for the subject keyword, the popularity score indicating how likely the subject keyword is to be included in a job-related search query as a search term.

8. The method of claim 1, comprising adjusting the priority score based on frequency of appearance of the subject keyword in certain fields of member profiles maintained by the on-line social network.

9. The method of claim 1, wherein the web page is a job search directory page.

10. The method of claim 1, wherein the web page represents a member profile maintained by the on-line social network system.

11. A computer-implemented system comprising:
one or more processors; and
a non-transitory computer readable storage medium comprising instructions that when executed by the one or processors cause the one or more processors to perform operations comprising:
accessing a set of search results produced by a search engine in response to a search request that includes a subject keyword, each entry in the set of search results assigned by the search engine a respective quality score, the set of search results including one or more relevant entries that originate from an on-line social network system, the search engine and the on-line social network system provided by different entities;

calculating a relevance score for the subject keyword as the sum of respective quality scores assigned to the entries in the set of search results that originate from the on-line social network system;

executing a probabilistic model that takes into account the relevance score to generate a priority score for the subject keyword;

selectively including the subject keyword in a web page generated by the on-line social network system, based on the priority score; and causing presentation of the web page on a display device.

12. The system of claim 11, wherein each item from the one or more relevant entries is a job posting maintained by the on-line social network system.

13. The system of claim 11, comprising selecting the set of search results to access in response to determining that the search request includes an indicator term in addition to the subject keyword, the indicator term indicating that the search request is a job-related search request.

14. The system of claim 11, comprising using one or more further signals, in addition to the combination of respective quality scores assigned to the relevant entries in the set of search results, to generate the relevance score.

15. The system of claim 14, wherein a signal from the one or more further signals is a count of the relevant entries.

16. The system of claim 11, comprising monitoring user engagement signals with respect to any of the relevant entries and adjusting the relevance score based on result of the monitoring.

17. The system of claim 11, comprising calculating, in addition to the relevance score, a popularity score for the subject keyword, the popularity score indicating how likely the subject keyword is to be included in a job-related search query as a search term.

18. The system of claim 11, comprising adjusting the priority score based on frequency of appearance of the subject keyword in certain fields of member profiles maintained by the on-line social network.

19. The system of claim 11, wherein the web page is a job search directory page or a member profile maintained by the on-line social network system.

20. A machine-readable non-transitory storage medium having instruction data executable by a machine to cause the machine to perform operations comprising:

accessing a set of search results produced by a search engine in response to a search request that includes a subject keyword, each entry in the set of search results assigned by the search engine a respective quality score, the set of search results including one or more relevant entries that originate from an on-line social network system, the search engine and the on-line social network system provided by different entities;

calculating a relevance score for the subject keyword as the sum of respective quality scores assigned to the entries in the set of search results that originate from the on-line social network system, executing a probabilistic model that takes into account the relevance score to generate a priority score for the subject keyword;

based on the priority score, selectively including the subject keyword in a web page generated by the on-line social network system; and causing presentation of the web page on a display device.

* * * * *